(12) United States Patent
Kim et al.

(10) Patent No.: US 9,774,018 B2
(45) Date of Patent: Sep. 26, 2017

(54) ENERGY STORING APPARATUS (71) Applicant: SK Innovation Co., Ltd., Seoul (KR)

(72) Inventors: Hyunseok Kim, Daejeon (KR); Taewoo Kim, Daejeon (KR); Woojin Lee, Daejeon (KR); Jaihyun Choi, Daejeon (KR); Jeehoon Jeon, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 6 days.

(21) Appl. No.: 14/648,964

(22) PCT Filed: Nov. 13, 2013

(86) PCT No.: PCT/KR2013/010265
§ 371 (c)(1),
(2) Date: Jun. 2, 2015

(87) PCT Pub. No.: WO2014/088229
PCT Pub. Date: Jun. 12, 2014

(65) Prior Publication Data
US 2015/0318522 A1    Nov. 5, 2015

(30) Foreign Application Priority Data

Dec. 3, 2012  (KR) .................. 10-2012-0138742

(51) Int. Cl.
*H01M 2/10* (2006.01)
*H01M 10/42* (2006.01)
*H01M 2/20* (2006.01)
*H02J 7/00* (2006.01)

(52) U.S. Cl.
CPC ......... *H01M 2/1077* (2013.01); *H01M 2/206* (2013.01); *H01M 10/425* (2013.01); *H02J 7/0013* (2013.01); *H02J 7/0045* (2013.01); *H01M 2010/4271* (2013.01); *H01M 2220/10* (2013.01)

(58) Field of Classification Search
USPC ....................................................... 439/944
See application file for complete search history.

(56) References Cited

U.S. PATENT DOCUMENTS

| | | | |
|---|---|---|---|
| 5,437,939 A | 8/1995 | Beckley | |
| 8,872,482 B2 | 10/2014 | Jung | |
| 2010/0062329 A1* | 3/2010 | Muis | H01M 2/206 429/158 |
| 2011/0084664 A1* | 4/2011 | White | B60L 11/1816 320/134 |
| 2012/0032638 A1* | 2/2012 | Jung | B60L 3/0046 320/112 |

(Continued)

FOREIGN PATENT DOCUMENTS

| | | |
|---|---|---|
| JP | 7282856 A | 10/1995 |
| JP | 2011204382 A | 10/2011 |

(Continued)

Primary Examiner — Victoria Lynch
(74) Attorney, Agent, or Firm — The Webb Law Firm (57) ABSTRACT Provided is an energy storage apparatus capable of freely adjusting an energy storage capacity by including a integrated battery platform including a battery, a power relay assembly, and a battery management system; and a battery tray including a battery and coupled to the battery platform to connect the batteries in series with each other.

5 Claims, 6 Drawing Sheets (56) References Cited

U.S. PATENT DOCUMENTS

2012/0181956 A1  7/2012  Rossel
2012/0183831 A1  7/2012  Jeong et al.

FOREIGN PATENT DOCUMENTS

| KR | 101000550 B1 | 12/2010 |
| KR | 1020120082164 A | 7/2012 |
| KR | 101182192 B1 | 9/2012 |

* cited by examiner

ENERGY STORING APPARATUS

CROSS-REFERENCE TO RELATED APPLICATIONS

This application is the United States national phase of International Application No. PCT/KR2013/010265 filed Nov. 13, 2013, and claims priority to Korean Patent Application No. 10-2012-0138742 filed Dec. 3, 2012, the disclosures of which are hereby incorporated in their entirety by reference.

TECHNICAL FIELD

The present invention relates to an energy storage apparatus, and more particularly, to an energy storage apparatus capable of having a freely adjustable capacity.

BACKGROUND ART

A smart grid means the next generation intelligent power grid through which a power supplier and a consumer bi-directionally exchange real time information with each other using a state-of-the-art information communication technology (ICT) to optimize energy efficiency. That is, it is to raise efficiency, reliability, and stability of a power grid and efficiently manage distributed resources through innovation of generating, supplying, and using systems of energy utilizing the power network and the state-of-the-art ICT (bidirectional communication, sensors, computing, and software).

In addition, a green power information technology (IT) means a technology of freely creating and distributing various power information by installing power plants, power-transmission towers, electric poles, and a number of sensors in electric home appliances. A traditional power supplying system that has been used up to now is subjected to power transmitting and distributing processes of converting a large capacity of electricity generated by a power generating company into high voltage, middle voltage, and low voltage electricity, and has a power company-centric unilateral structure (centralized power supplying structure) in which a balance of production (power generation) and consumption (demand) of power is provided by controlling a power generation sector.

However, since the traditional power supplying system as described above uses physical switches or analog type controllers, it has a limitation in long distance power transmission or power transmission and distribution between regional power companies, control and adjustment of various distribution power supplies such as wind force, sunlight, or the like, necessity to control a power demand section for securing reliability and safety of power, and the like. Therefore, a horizontal, cooperative, distributed, and flexible power network has been demanded, such that smartness of a power grid starting with grafting a computer and a communication technology into an existing power distribution network has been spread to all fields such as power transmission, power transformation, demand management, and the like.

Here, an energy storage system (ESS) is a requisite component of the smart grid, and it is necessary to apply an energy storage technology in order to stabilize intermittent output characteristics of a renewable power generation source such as sunlight, wind force, or the like, in the short term and overcome a time difference between power generation and a demand.

However, since energy storage systems according to the related art have a defined capacity, in the case in which a capacity of the energy storage system should be increased due to an increase in a load amount, a new energy storage system corresponding to a total required capacity should be installed.

In addition, although a separate battery is connected to an existing energy storage system having a small capacity to increase a capacity of the energy storage system, the energy storage system and a power line of the separate battery should be directly connected to each other, which is difficult and troublesome.

As the related art, U.S. Patent Application Publication No. 2012-0181956 entitled "Device for Storing Electrical Energy" has been disclosed.

RELATED ART DOCUMENT

Patent Document (Patent Document1) US 20120181956 A1 (published on Jul. 19, 2012)

DISCLOSURE

Technical Problem

An object of the present invention is to provide an energy storage system capable of having a freely adjustable energy storage capacity by stacking batteries in the energy storage system to allow the batteries to be connected to each other.

Technical Solution

In one general aspect, an energy storage apparatus includes: a battery platform including a first battery, a controlling unit connected to the first battery to control the first battery, and a first connector connected in series with one power line of the first battery; and a battery tray including a second battery and a second connector connected to both power lines of the second battery, wherein the battery platform and the battery tray are stacked and coupled to each other, such that the first connector of the battery platform and the second connector of the battery tray are coupled to each other, and the first battery of the battery platform and the second battery of the battery tray are connected in series with each other by the coupling between the connectors.

The controlling unit may include a power relay assembly (PRA) having one side connected to an output terminal of the first battery and the other side connected to a power grid; and a battery management system (BMS) connected to the power relay assembly to control power supplying and storing of the first battery.

The battery platform may include the first connector formed at a lower side thereof, and the battery tray may include the second connector formed at an upper side thereof.

The battery tray may further include a first connector formed at a lower side thereof, the first connector of the battery tray being connected in series with one power line of the second battery.

The first connector of the battery platform may be provided with a pair of sockets, which are connected to each other by a connecting part, such that the first connector is connected in series with one power line of the first battery, and the second connector of the battery tray may be provided with a pair of pins connected to both power lines of the second battery and be provided with a protrusion bar blocking the connecting part, such that the pair of pins are coupled to the pair of sockets by coupling the first connector and the second connector to each other, and the connecting part is blocked by the protrusion bar.

The connecting part of the first connector may include: a connecting socket connected to one of the pair of sockets; and a slider having one side at which a connecting pin coupled to the connecting socket is formed and the other side connected to the other of the pair of sockets, the slider being provided with a through-hole and an inclined surface, and the protrusion bar being inserted into the through-hole along the inclined surface, such that the slider moves, thereby blocking the connecting part.

The connecting part of the first connector may further include an elastic means allowing the slider to closely adhere to the connecting socket.

Advantageous Effects

The energy storage apparatus according to the present invention has an advantage that a capacity of the energy storage apparatus may be simply adjusted by stacking batteries in the energy storage apparatus.

In addition, since the energy storage apparatus and a power line of a separate battery do not need to be directly connected to each other in order to adjust the capacity of the energy storage apparatus, a process for adjusting the capacity is simple.

BEST MODE

Hereinafter, an energy storage apparatus according to an exemplary embodiment of the present invention will be described in detail with reference to the accompanying drawings.

Figure 1:
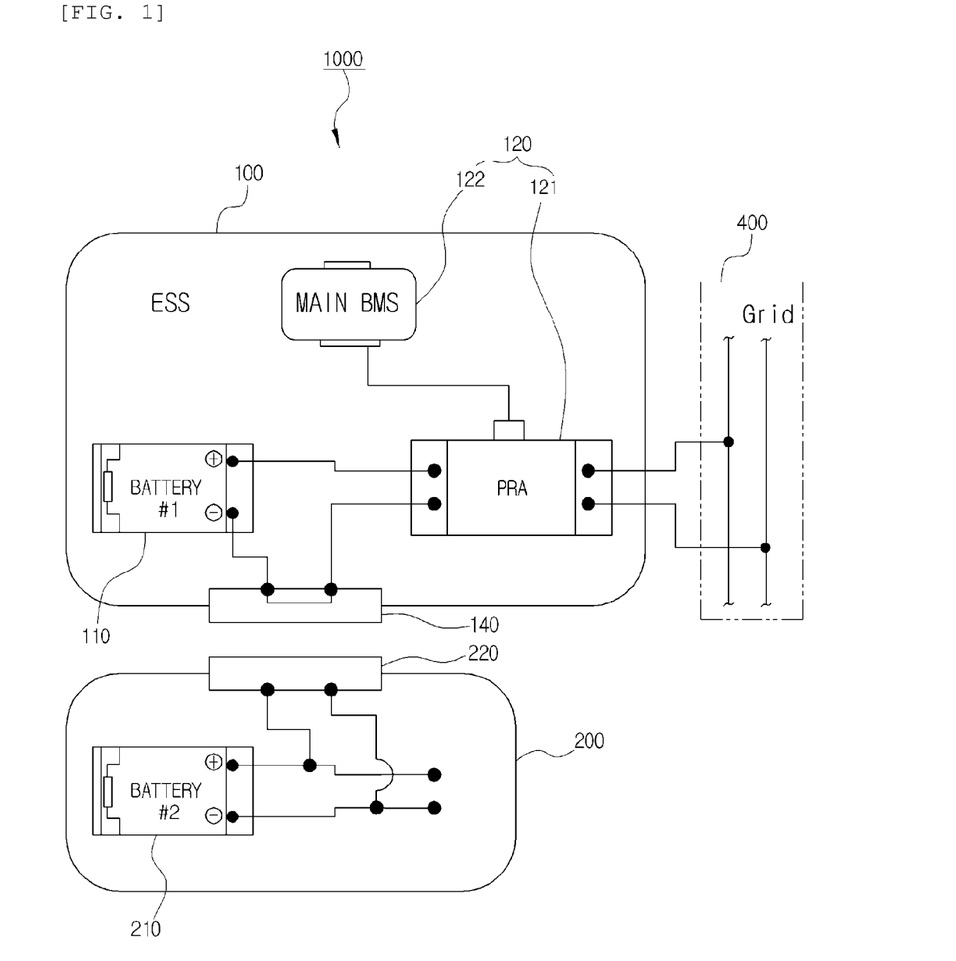
FIGS. 1 to 3 are circuit diagrams illustrating an energy storage apparatus according to an exemplary embodiment of the present invention.
Figure 2:
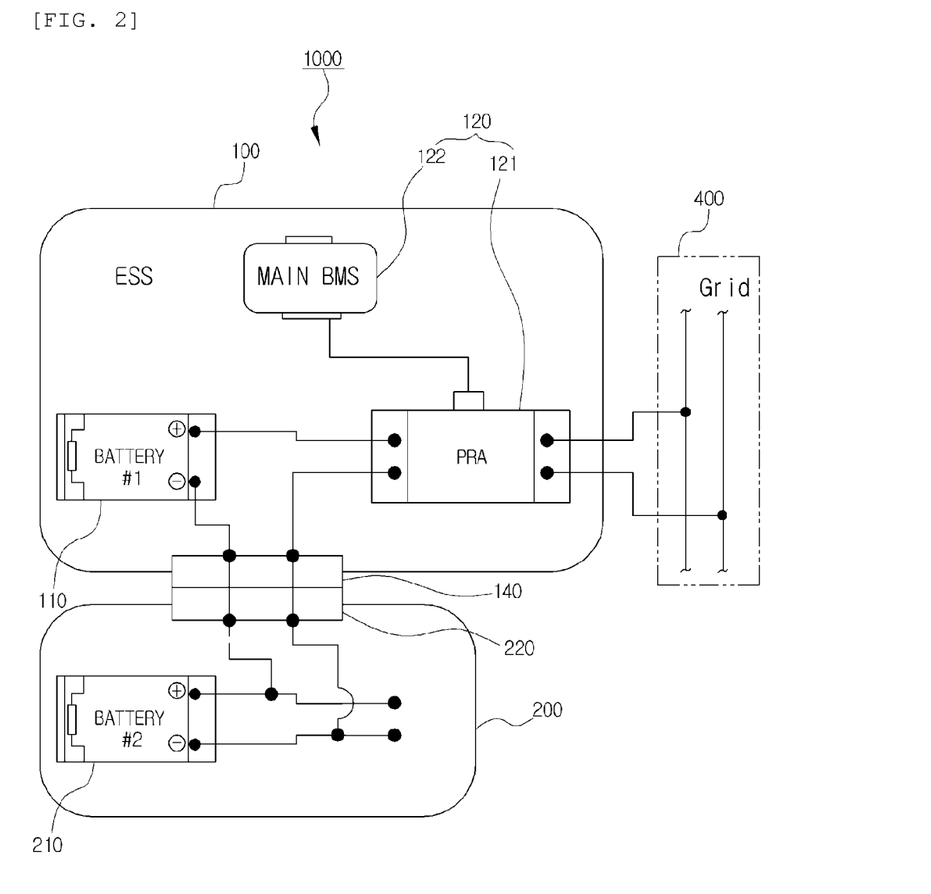

FIGS. 1 and 2 are circuit diagrams illustrating an energy storage apparatus according to an exemplary embodiment of the present invention.

As illustrated, the energy storage apparatus 1000 according to the exemplary embodiment of the present invention includes a battery platform 100 including a first battery 110, a controlling unit 120 connected to the first battery 110 to control the first battery 110, and a first connector 140 connected in series with one power line of the first battery 110; and a battery tray 200 including a second battery 210 and a second connector 220 connected to both power lines of the second battery 210, wherein the battery platform 100 and the battery tray 200 are stacked and coupled to each other, such that the first connector 140 of the battery platform 100 and the second connector 220 of the battery tray 200 are coupled to each other, and the first battery 110 of the battery platform 100 and the second battery 210 of the battery tray 200 are connected in series with each other by the coupling between the connectors 140 and 220.

First, the energy storage apparatus 1000 according to the exemplary embodiment of the present invention is mainly configured of the battery platform 100 and the battery tray 200.

The battery platform 100 includes the first battery 110, the controlling unit 120, and the first connector 140, and the first battery 110 stores electrical energy therein and supplies the electrical energy. The controlling unit 120 is connected to the first battery 110 to monitor states such as a temperature, a voltage, a current, and the like, and control the first battery 110, thereby adjusting supply and demand between the first battery 110 and a power grid 400 connected to the first battery 110. Here, the battery platform 100 includes the first connector 140 connected in series with one power line of the first battery 110. That is, as illustrated in FIG. 1, the first connector 140 may be connected in series with one power line connecting an output terminal of the first battery 110 and the controlling unit 120 to each other. Hereinafter, as illustrated, a configuration in which the first connector 140 is connected in series with an anode power line will be described.

In addition, the battery tray 200 includes the second battery 210 and the second connector 220, and the second connector 220 is connected to both power lines of the second battery 210. That is, a cathode power line and an anode power line of the second battery 210 are connected to the second connector 220, but are in a state in which they are not connected to each other.

Here, the battery platform 100 and the battery tray 200 are stacked and coupled to each other, and the first connector 140 of the battery platform 100 and the second connector 220 of the battery tray 200 are coupled to each other. That is, the first connector 140 and the second connector 220 are coupled to each other by stacking the battery platform 100 and the battery tray 200, and the first battery 110 and the second battery 210 are configured to be connected in series with each other by coupling the first connector 140 and the second connector 220 to each other. Here, when the first connector 140 and the second connector 220 are coupled to each other, an anode terminal of the first battery 110 and a cathode terminal of the second battery 210 are connected to each other, an anode terminal of the second battery 210 is connected to the controlling unit 120, such that two batteries 110 and 210 are connected in series with each other, as illustrated in FIG. 2.

Therefore, in the case in which a capacity of power that may be supplied by or stored in only the first battery 110 included in the battery platform 100 is small, the battery platform 100 and the battery tray 200 are stacked to connect the two batteries 110 and 210 in series with each other, thereby making it possible to increase a capacity of the energy storage apparatus and use the increased capacity.

As described above, the energy storage apparatus according to the exemplary embodiment of the present invention has an advantage that the capacity of the energy storage apparatus may be simply adjusted by stacking the battery tray beneath the battery platform, which is one energy storage apparatus.

In addition, the controlling unit 120 may include a power relay assembly (PRA) 121 having one side connected to an output terminal of the first battery 110 and the other side connected to the power grid 400; and a battery management system (BMS) 122 connected to the power relay assembly 121 to control power supplying and storing of the first battery 110.

The controlling unit 120 is configured to connect the first battery 110 to the power grid 400 through the power relay assembly 121 to supply and store the power, and monitors states such as a temperature, a voltage, a current, and the like, of the first battery 110 by the battery management system 122 connected to the power relay assembly 121 to control a state of charge (SOC) and an output of the first battery 110. Here, when the battery tray 200 is stacked beneath and coupled to the battery platform 100, such that the first battery 110 and the second battery 210 are connected in series with each other, the battery management system 122 controls the power relay assembly 121, thereby making it possible to simultaneously control the first battery 110 and the second battery 210.

In addition, the battery platform 100 may include the first connector 140 formed at a lower side thereof, and the battery tray 200 may include the second connector 220 formed at an upper side thereof.

This is configured to stack the battery platform 100 and the battery tray 200 in a vertical direction to couple the battery platform 100 and the battery tray 200 to each other, such that the first connector 140 and the second connector 220 are coupled to each other by stack loads. That is, the first connector 140 and the second connector 220 are coupled to each other simultaneously with stacking the battery platform 100 on the battery tray 200.

Therefore, a separate structure for coupling the battery platform 100 and the battery tray 200 to each other is not required, and the connectors are connected to each other simultaneously with stacking the battery platform 100 on the battery tray 200, such that it is easy to increase a power capacity.

Figure 3:
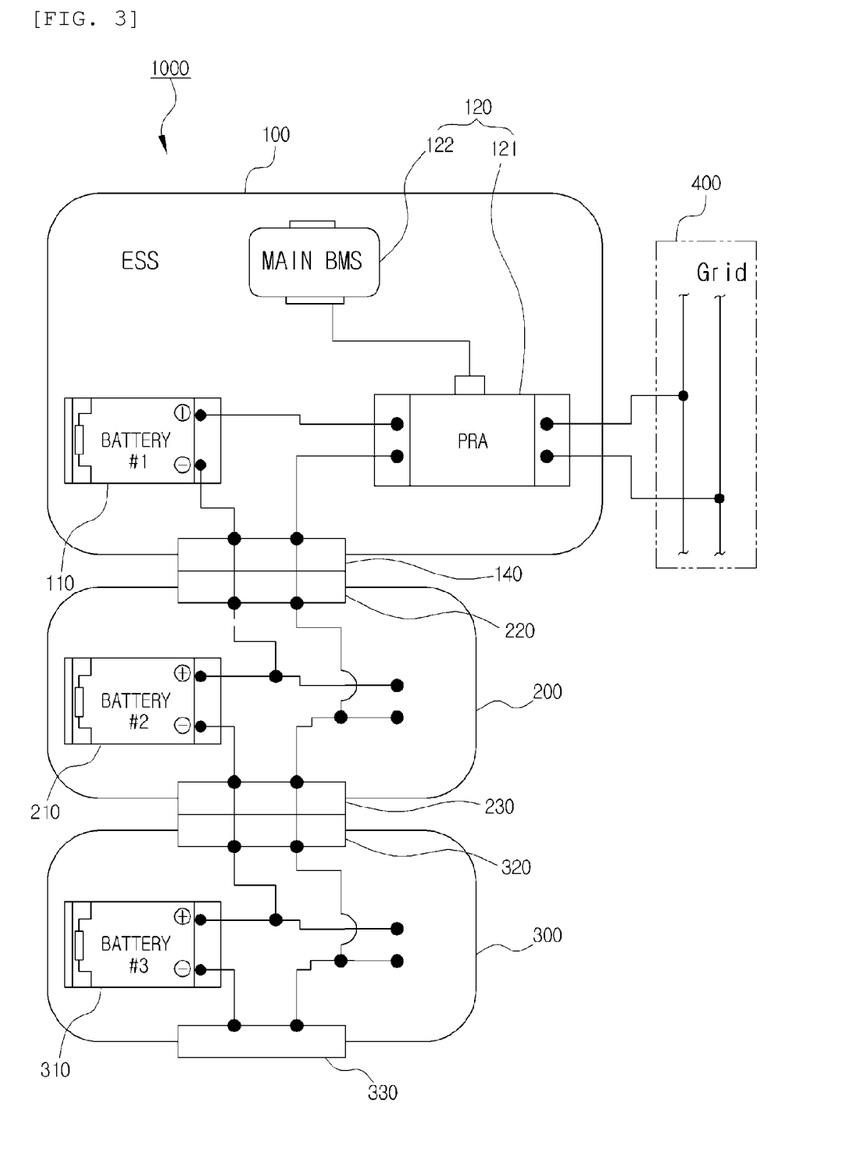

In addition, the battery tray 200 further includes a first connector 230 formed at a lower side thereof, wherein the first connector 230 of the battery tray 200 may be connected in series with one power line of the second battery 210.

The second connector 220 is formed at one side of the battery tray 200 and is coupled to the first connector 140 of the battery platform 100, and the first connector 230 is formed at the other side of the battery tray 200, thereby making it possible to increase a capacity by stacking another battery tray 300. That is, as illustrated in FIG. 3, the battery platform 100 and the battery trays 200 and 300 are stacked, such that the first battery 110, the second battery 210, and a third battery 310 may be connected in series with each other. Here, the battery tray 300 has a second connector 320 formed at an upper side thereof and a first connector 330 formed at a lower side thereof.

Therefore, when the second connector 220 is formed at the upper side of the battery tray 200 and the first connector 230 is formed at the lower side of the battery tray 200, another battery tray 300 is additionally coupled to the battery tray 200, thereby making it possible to increase a capacity, and a plurality of battery trays are additionally stacked, thereby making it possible to adjust a capacity of the energy storage apparatus to a desired capacity.

Figure 4:
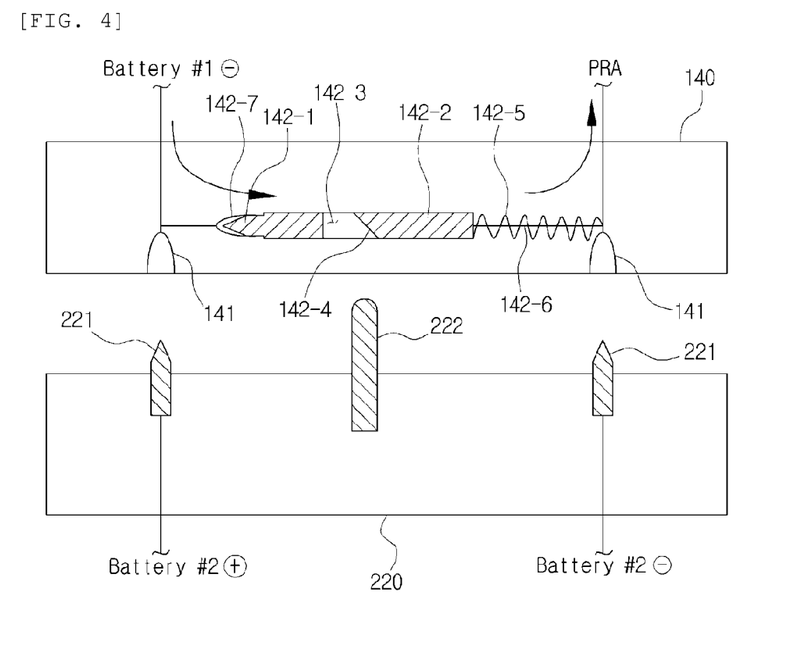
FIGS. 4 and 5 are schematic views illustrating connectors according to the exemplary embodiment of the present invention before and after being coupled to each other.

In addition, the first connector 140 of the battery platform 100 is provided with a pair of sockets 141, which are connected to each other by a connecting part 142, such that the first connector 140 is connected in series with one power line of the first battery 110, and the second connector 220 of the battery tray 200 is provided with a pair of pins 221 connected to both power lines of the second battery 210 and is provided with a protrusion bar 222 blocking the connecting part 142, such that the pair of pins 221 are coupled to the pair of sockets 141 by coupling the first connector 140 and the second connector 220 to each other, and the connecting part 142 is blocked by the protrusion bar 222.

That is, as illustrated in FIG. 4, the pair of sockets 141 are formed in the first connector 140 so that the first connector 140 is connected to each of the anode terminal of the first battery 110 and the power relay assembly 121 in a state in which they are connected to each other by the connecting part 142, and the pair of pins 221 are formed in the second connector 220 so that the second connector 220 is connected to each of the cathode terminal and the anode terminal of the second battery 210 and the protrusion bar 222 is formed in the second connector 220. Therefore, when the battery platform 100 and the battery tray 200 are stacked and coupled to each other, the first connector 140 and the second connector 220 are coupled to each other. In this case, the connecting part 142 is blocked by the protrusion bar 222, and the pair of pins 221 are coupled to the pair of sockets 141, such that the first battery 110 and the second battery 210 are connected in series with each other.

Therefore, the anode terminal of the first battery 110 and the cathode terminal of the second battery 210 are connected to each other, and the anode terminal of the second battery 210 is connected to the power relay assembly 121, such that the two batteries may be connected in series with each other.

Figure 5:
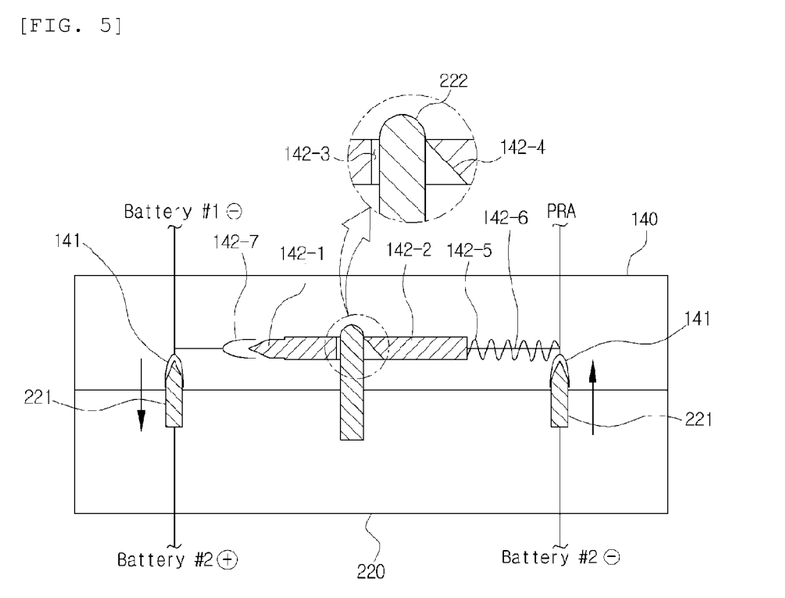

In addition, the connecting part 142 of the first connector 140 includes a connecting socket 142-7 connected to one of the pair of sockets 141; and a slider 142-2 having one side at which a connecting pin 142-1 coupled to the connecting socket 142-7 is formed and the other side connected to the other of the pair of sockets 141, wherein the slider 142-2 is provided with a through-hole 142-3 and an inclined surface 142-4, and the protrusion bar 222 is inserted into the through-hole 142-3 along the inclined surface 142-4, such that the slider 142-2 moves, thereby making it possible to block the connecting part 142.

That is, as illustrated in FIGS. 4 and 5, in the case in which the connecting socket 142-7 is connected to one of the sockets by a connecting line 142-6, the slider 142-2 is connected to the other of the sockets by a connecting line 142-6, the slider 142-2 is coupled and connected to the connecting socket 142-7, and the protrusion bar 222 is disposed at a lower side of the inclined surface 142-4 formed in the slider 142-2, when the connectors 140 and 220 are coupled to each other, the protrusion bar 222 contact the inclined surface 142-4 of the slider 142-2, such that it may be inserted into and coupled to the through-hole 142-3 while the slider 142-2 moves. Therefore, the connecting pin 142-1 formed at one side of the slider 142-2 gets out of the connecting socket 142-7 by the movement of the slider 142-2, such that the connecting part 142 connecting the pair of sockets 141 to each other may be blocked.

In addition, an elastic means 142-5 allowing the slider 142-2 to closely adhere to the connecting socket 142-7 may be provided.

This is to allow the slider 142-2 to closely adhere to the connecting socket 142-7 by the elastic means 142-5 in the first connector 140 to connect the anode terminal of the first terminal and the power relay assembly 121 to each other, thereby making it possible to use only the battery platform 100 as the energy storage apparatus, in a state in which the first connector 140 and the second connector 220 are not coupled to each other, but are separated from each other as illustrated in FIG. 4, and allow the first battery 110 and the second battery 210 to be connected in series with each other to increase a capacity of the energy storage apparatus and use the increased capacity, in a state in which the battery platform 100 and the battery tray 200 are stacked and coupled to each other to couple the first connector 140 and the second connector 220 to each other as illustrated in FIG. 5. That is, the battery trays are added by the elastic means 142-5, thereby making it possible to increase the capacity of the energy storage apparatus and use the increased capacitor, or the battery trays are separated by the elastic means 142-5, thereby making it possible to decrease the capacity of the energy storage apparatus and use the decreased capacitor.

Here, the elastic means may be formed in various forms such as a spring scheme, a tension scheme, a mechanical scheme, or the like.

Figure 6A:
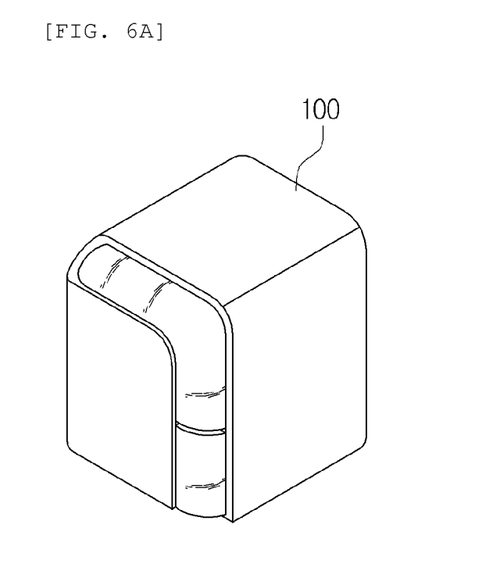
FIGS. 6A to 6C are perspective views illustrating the energy storage apparatus according to the exemplary embodiment of the present invention.
Figure 6B:
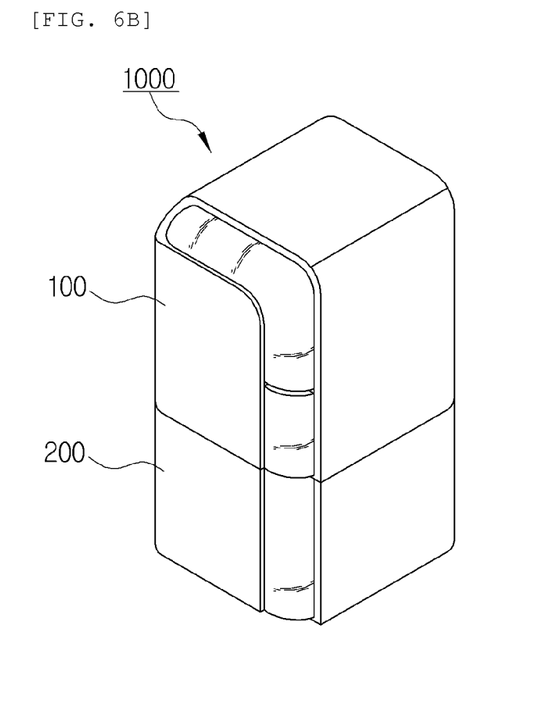
Figure 6C:
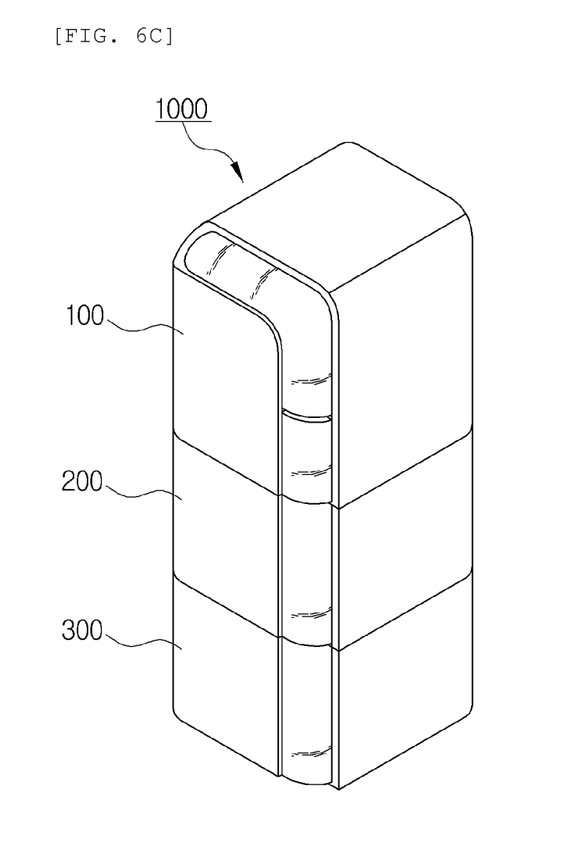

Therefore, as illustrated in FIGS. 6A to 6C, one battery tray 200 is stacked beneath the battery platform 100, and the battery trays are stacked in a multi-stage such as a two-stage, a three-stage, or the like, such that the capacity of the energy storage apparatus may be adjusted as desired. Therefore, since the energy storage apparatus and a power line of a separate battery do not need to be directly connected to each other in order to adjust the capacity of the energy storage apparatus, a process for adjusting the capacity is simple. In addition, since a battery tray that is not used may be separated and separately stored, management is easy. Further, in the case in which a problem occurs in some of the battery trays, power may be supplied by some of the capacity without stopping the supply of power by the entire energy storage apparatus, and only the battery trays in which the problem occurs may be repaired and replaced, such that maintenance may be easy and a cost may be decreased.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1000: energy storage apparatus
100: battery platform
110: first battery
120: controlling unit
121: power relay assembly (PRA)
122: battery management system (BMS)
140: first connector
141: socket
142: connecting part
142-1: connecting pin
142-2: slider
142-3: through-hole
142-4: inclined surface
142-5: elastic means
142-6: connecting line
142-7: connecting socket
200: battery tray
210: second battery
220: second connector
221: pin
222: protrusion bar
230: first connector
300: battery tray
310: third battery
320: second connector
330: first connector
400: power grid

The invention claimed is:

1. An energy storage apparatus comprising:
    a battery platform including a first battery, a controlling unit connected to the first battery to control the first battery, and a first connector connected in series with one power line of the first battery; and
    a battery tray including a second battery and a second connector connected to both power lines of the second battery;
    wherein the first connector of the battery platform is provided with a pair of sockets, which are connected to each other by a connecting part including a connecting socket connected to one of the pair of sockets and a slider having a through-hole and an inclined surface, and
    the second connector of the battery tray is provided with a pair of pins connected to both power lines of the second battery and is provided with a protrusion bar which are inserted to the through-hole, contacted to the inclined surface and moves the slider, such that the connection between the sockets of the first connector are disconnected.

2. The energy storage apparatus of claim 1, wherein the first connector of the battery platform is formed at a lower side thereof, and the second connector of the battery tray is formed at an upper side thereof.

3. The energy storage apparatus of claim 2, wherein the battery platform and the battery tray are stacked and coupled to each other, such that the first connector of the battery platform and the second connector of the battery tray are coupled to each other, and the first battery of the battery platform and the second battery of the battery tray are connected in series with each other by the coupling between the connectors.

4. The energy storage apparatus of claim 1, wherein the connecting part of the first connector further includes an elastic means allowing the slider to closely adhere to the connecting socket.

5. The energy storage apparatus of claim 1, wherein the controlling unit includes a power relay assembly (PRA) having one side connected to an output terminal of the first battery and the other side connected to a power grid; and a battery management system (BMS) connected to the power relay assembly to control power supplying and storing of the first battery.

* * * * *